US012300052B2

(12) United States Patent
Mondrow et al.

(10) Patent No.: US 12,300,052 B2
(45) Date of Patent: *May 13, 2025

(54) INTELLIGENT LOCK CREDENTIAL VALIDATION

(71) Applicant: RemoteLock Inc., Denver, CO (US)

(72) Inventors: Nolan Mondrow, Englewood, CO (US); Robert Goff, Golden, CO (US); Eric Carlson, Boulder, CO (US)

(73) Assignee: RemoteLock Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,010

(22) Filed: Mar. 6, 2024

(65) Prior Publication Data

US 2024/0362962 A1 Oct. 31, 2024

Related U.S. Application Data

(63) Continuation of application No. 17/339,194, filed on Jun. 4, 2021, now Pat. No. 11,948,412, which is a continuation of application No. 17/011,874, filed on Sep. 3, 2020, now Pat. No. 11,049,342.

(51) Int. Cl.
G07C 9/00 (2020.01)
G06F 1/28 (2006.01)
G06N 5/02 (2023.01)
H04W 12/06 (2021.01)

(52) U.S. Cl.
CPC .......... *G07C 9/00563* (2013.01); *G06F 1/28* (2013.01); *G06N 5/02* (2013.01); *H04W 12/06* (2013.01)

(58) Field of Classification Search
CPC ........ G07C 9/00563; G06F 1/28; G06N 5/02; H04W 12/06
See application file for complete search history.

(56) References Cited

U.S. PATENT DOCUMENTS

| 5,377,270 | A | 12/1994 | Koopman, Jr. et al. |
| 10,453,149 | B1 | 10/2019 | Gaudin et al. |
| 2004/0021552 | A1 | 2/2004 | Koo |

(Continued)

FOREIGN PATENT DOCUMENTS

WO 2022051174 A1 3/2022

OTHER PUBLICATIONS

Eustaquio, Cal J., "Final Office Action regarding U.S. Appl. No. 17/339,194," mailed Sep. 7, 2023, 27 pages, Publ. in: US.

(Continued)

*Primary Examiner* — Nabil H Syed
*Assistant Examiner* — Cal J Eustaquio
(74) *Attorney, Agent, or Firm* — NOD Law PC

(57) ABSTRACT

A method for operating an access control device having a processor, a memory, and an internet connection comprises receiving a credential from a user; checking, by comparing the credential to matching credential information that would indicate the user is authorized to enter stored in the memory of the access control device, if no matching credential information that indicates the user is authorized is found in the memory of the access control device, then checking, at a remote cloud server, a list of buffered credential information for the matching credential information that indicates the user is authorized, and if the matching credential information that indicates the user is authorized is found, sending an unlock signal from the remote cloud server to the access control device.

18 Claims, 11 Drawing Sheets

(56) References Cited

U.S. PATENT DOCUMENTS

| | | |
|---|---|---|
| 2011/0055292 A1 | 3/2011 | Madau et al. |
| 2013/0211623 A1 | 8/2013 | Thompson et al. |
| 2014/0210640 A1 | 7/2014 | Rahman et al. |
| 2014/0267577 A1 | 9/2014 | Weber et al. |
| 2017/0132864 A1 | 5/2017 | Adam et al. |
| 2017/0374560 A1 | 12/2017 | Judge et al. |
| 2018/0012272 A1 | 1/2018 | Menard et al. |
| 2018/0108192 A1 | 4/2018 | Ho et al. |
| 2020/0076494 A1 | 3/2020 | Shindou et al. |

OTHER PUBLICATIONS

Eustaquio, Cal J., "Non-Final Office Action regarding U.S. Appl. No. 17/011,874," mailed Dec. 8, 2020, 16 pages, Publ. in: US.
Eustaquio, Cal J., "Non-Final Office Action regarding U.S. Appl. No. 17/339,194," mailed Apr. 20, 2023, 22 pages, Publ. in: US.
Harry C. Kim, "International Search Report and Written Opinion Regarding International Application No. PCT/US2021/047850", Sep. 20, 2021, p. 12, Publ. in: US.
Nakamura, Yukari, "International Preliminary Report on Patentability for PCT Application No. PCT/US2021/047850," Issued on Mar. 7, 2023, Mailed on Mar. 16, 2023, p. 10, Publ. in: CH.
Nene, Sammit S, "Response to Final Office Action regarding U.S. Appl. No. 17/339,194," filed Nov. 7, 2023, 15 pages, Publ. in: US.
Neugeboren, Craig, "Response to Non-Final Office Action regarding U.S. Appl. No. 17/339,194," filing date Aug. 22, 2023, 18 pages, Publ. in: US.
Neugeboren, Craig, "Response to Office Action Regarding U.S. Appl. No. 17/011,874", Mar. 8, 2021, p. 10, Publ. in: US.

INTELLIGENT LOCK CREDENTIAL VALIDATION

CROSS-REFERENCE TO RELATED APPLICATIONS

This application is a Continuation of U.S. patent application Ser. No. 17/339,194 entitled "INTELLIGENT LOCK CREDENTIAL VALIDATION" filed Jun. 4, 2021, which is a Continuation of U.S. patent application Ser. No. 17/011,874 entitled "INTELLIGENT LOCK CREDENTIAL VALIDATION" filed Sep. 3, 2020, now issued as U.S. Pat. No. 11,049,342 on Jun. 29, 2021, the entire disclosures of which are hereby incorporated by reference for all proper purposes, as if fully set forth herein.

FIELD OF THE DISCLOSURE

The present disclosure relates generally to intelligent, internet connected door locks. In particular, but not by way of limitation, the present disclosure relates to systems, methods and apparatuses for improving remote communication capabilities across door locks and access control systems.

BACKGROUND

Access control systems electronically control the locking and unlocking of doors including those for buildings, office suites, residences, rental units and retail establishments. These systems typically use some type of "credentialing" method such as pressing RFID cards to a reader, inserting magnetic cards into a slot (e.g., in hotel door locks), presenting biometric features such as fingerprint or facial recognition, or entering PIN codes on a keypad to identify people who are allowed to enter. In order to grant access to people for multiple doors in a building or across multiple buildings, the selected credentialing method has to be synchronized with the lock/device at each door. There are three primary types of credentialing systems: wired systems, standalone systems, and standalone door locks. Each of these existing types of credentialing systems create various challenges in terms of expense, ease of installation, ease of use, connectivity, and security. Therefore, a need exists for improved access control systems that remedy these deficiencies.

SUMMARY

An aspect of the present disclosure provides a method for operating an access control device having a processor, a memory, and an internet connection. The method may comprise receiving a credential from a user and checking, by comparing the credential to matching credential information that would indicate the user is authorized to enter, stored in the memory of the access control device. If no matching credential information that indicates the user is authorized is found in the memory of the access control device, then the method may comprise checking, at a remote cloud server, a list of buffered credential information for the matching credential information that indicates the user is authorized. If the matching credential information that indicates the user is authorized is found in the remote cloud server, the method may comprise sending an unlock signal from the remote cloud server to the access control device.

Another aspect of the disclosure provides a method for operating an access control device having a processor, and a memory, and configured to connect to the internet. The method may comprise receiving a credential from a user and checking, by comparing the credential to matching credential information that would indicate the user is authorized to enter, stored in the memory of the access control device. If no matching credential information that indicates the user is authorized is found in the memory of the access control device, then the method may comprise checking, at a remote cloud server, a list of buffered credential information for the matching credential information that indicates the user is authorized. If there is no matching credential information that indicates the user is authorized is due to user error in inputting the credential, the method may comprise identifying the user error at the remote cloud server; and sending one or more notifications regarding the user error.

Yet another aspect of the disclosure provides a method for operating a plurality of access control devices each having a processor, a memory, and an internet connection. The method may comprise receiving one or more credentials from one or more users, and checking at least one of the one or more received credentials by comparing the one or more received credentials to matching credential information that would indicate the one or more users are authorized to enter to a list of buffered credential information at a remote cloud server. If the matching credential information that indicates at least one of the one or more users are authorized is found the method may comprise sending one or more unlock signals from the remote cloud server to the one or more the access control devices via a lock translation layer. The lock translation layer may be configured to send a plurality of different wireless communication protocol language types to the one or more locks.

DETAILED DESCRIPTION

Figure 1:
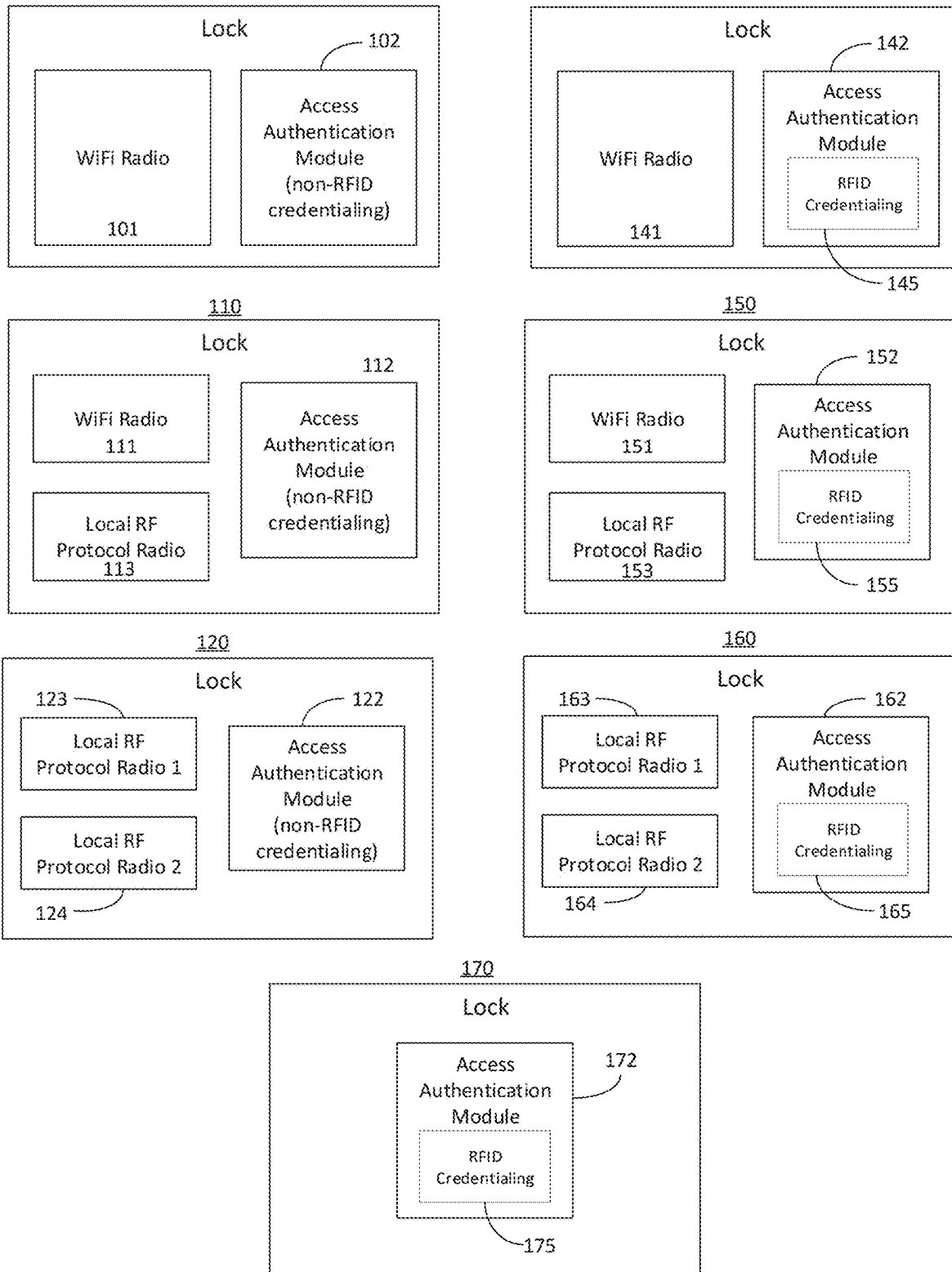
FIG. 1 depicts logical block diagrams of several embodiments of intelligent locks according to the present disclosure.

The word "exemplary" is used herein to mean "serving as an example, instance, or illustration." Any embodiment described herein as "exemplary" is not necessarily to be construed as preferred or advantageous over other embodiments.

Existing wired access control systems typically require electrical cables to be pulled to each door from a central control panel in order to control locking/unlocking doors and to control credentialing mechanisms (e.g., through a card reader or PIN keypad). The control panel is then wired to a computer that runs software to manage users. The primary elements of this kind of system are (1) a central computer software, (2) a door controller(s), (3) a door locking/unlocking device (electric strike, magnetic lock, etc.), and (4) a credentialing mechanism (card reader, keypad, etc.).

Throughout the disclosure, the term "administrative user" may be used to refer to an individual or set of authorized individuals who own locks or otherwise have permission to change settings of one or more locks. The term "access user" may be used to refer to an individual or set of individuals who attempt to gain access to a locked area via entering a code into, or presenting a credential to, a lock of the present disclosure.

Existing standalone systems are similar to wired systems except they only control a single door and are not part of a centralized system. The primary elements of this kind of system are (1) a door controller, (2) a door locking/unlocking device (electric strike, magnetic lock, etc.), (3) a credentialing mechanism (card reader, keypad, etc.), and sometimes (4) a non-connected computer running software to manage access users. In the case that software is used, the access user information is transferred from the software to the system using some type of plugin cable or reader (e.g. a USB cable, PDA device, etc.).

Existing standalone door locks are single unit door locks with either a keypad, card reader, or other credentialing system built into the lock. These units are comprised of a controller, locking/unlocking device, and credentialing system all-in-one. Sometimes a non-connected computer running software to manage access users is used. In this case as well, the access user information may be transferred from the software to the door lock using some type of plugin cable or reader (e.g. a USB cable, PDA device, etc.).

Aspects of the present disclosure provide systems, methods, and apparatuses for addressing the access control challenges previously described. Embodiments may include door locks that are both directly cloud-controlled via WiFi and locally RF connected and integrated with access control systems. Though other internet-connected door locks exist, most typically use the proprietary or standard local RF protocols (previously described) to then connect, via a gateway for the protocol, to the internet via a local wired or wireless router. For the purposes of clarity in the present disclosure, the term "local RF protocol" will be used to refer to a proprietary or standard (e.g., BLE, ZigBee, Z-Wave) RF protocol that is used to communicate within a local area network (LAN), mesh network, or other network in a local building environment, rather than over a Wide Area Network (WAN) or cellular data network. These local RF protocols may also be referred to as "short-range RF protocols." The term WiFi will be used to refer to wireless internet transmission protocols over a WAN. Though WiFi is technically a radio frequency (RF) protocol, for purposes of clarity in this disclosure, it will not be referred to as an RF protocol, and will rather be referred to specifically as WiFi.

Using one of these local RF protocols requires the premises to have both the physical local protocol gateway (usually many of them) as well as the wired or wireless internet router, or an appliance that is a combination of the two. Many types of building premises (e.g., hotels, office buildings) already have many wired or wireless internet routers to provide internet access to their occupants, so it is advantageous to simply utilize this existing hardware instead of installing additional local gateway hardware. Some Wi-Fi connected locks which utilize existing routers do exist, but a main challenge to widespread implementation of these locks is that battery life is short because of the high-power requirements of WiFi transmission as compared to local RF protocol. Remote door locks that have only local RF protocol radios use less battery power, but their transmission capability is less powerful than that of a WiFi radio and require precise positioning of gateways as described above. During peak transmission times, the lower power transmission capability can result in failed data transmissions. Therefore, WiFi-alone door locks and local RF protocol-alone door locks both have limitations.

Locks according to the present disclosure may obtain access user credentials in several different ways. In some embodiments, the lock may comprise a numerical or alphanumerical keypad or touchscreen interface. In some embodiments, the lock may comprise an RFID reader, biometric reader, BLE reader, magnetic stripe, and/or near-field communication (NFC) reader. These may accept credentials that are stored in a key card, fob, smartphone, personal biometric signatures, or other physical device via radio frequency transmission over a very short range (e.g., less than 6 inches away from the reader) In some embodiments, a single lock may comprise multiple or all of these types of credential acceptance mechanisms. The RFID, BLE, and NFC readers all operate via a type of radio-frequency communication, but to distinguish the reader "credential acceptance" functionality from the local RF protocol radio transmissions that are sent to the cloud server, the RFID, BLE, and NFC credential acceptance functionality will be referred to throughout the disclosure as "RF credentialing."

Locks in accordance with present disclosure may comprise one or more types of wireless transceivers. For the purposes of the present disclosure, a wireless transceiver may refer to any device that transmits and/or receives data wirelessly. Certain types of wireless transceivers may be referred to specifically as radios, while others may be referred to as credentialing mechanisms and/or devices. Locks according to the present disclosure may comprise no radios, a single type of radio, or combinations of multiple types of radios. For example, an embodiment may comprise a WiFi radio only. Another embodiment may comprise both a WiFi radio and BLE radio. Another may comprise a BLE radio and another local RF protocol but no WiFi radio. For example, they may comprise a BLE radio and a Zigbee or Zwave radio. Each of these embodiments (WiFi only, WiFi plus BLE, BLE plus Zigbee or Zwave) may implement one or more access user authorization methods.

These access user authorization methods may include physical or touchscreen keypad code entry that is verified either by remote server authentication, local Lock Controlling Device authentication or local algorithm authentication.

Remote server authentication of a code entry refers to a system wherein an owner of the lock sets a numeric or alphanumeric code on a remote server, and when a user enters the code on the physical lock, the lock communicates either wired or wirelessly with the server to verify if the code matches and access is authorized. Local Lock Controlling Device authentication of a code entry refers to a system wherein an owner of the lock sets a numeric or alphanumeric code on a remote server, the remote server instantly (or shortly thereafter) sends the code to a Lock Controlling Device and when a user enters the code on the physical lock, the Lock Controlling Device checks the code entered by the user to verify if the code matches that previously received from the remote server and access is authorized. Local algorithm authentication refers to a system wherein an administrative user of a lock receives a numeric or alphanumeric code generated by an algorithm based on a serial number of the lock (e.g., on paper or via an online system of the manufacturer), and when an access user enters the code, the algorithm is performed locally at the lock, without communicating wired or wirelessly to any server.

Other kinds of access user authorization methods may be used instead of or in conjunction with the remote server authentication or local algorithm authentication previously described. For example, authentication via a biometric signature may be used. Biometric signatures such as fingerprints or facial recognition may be transmitted to a local reading device, a lock system capable of storing such information or a remote server for authentication. Authentication via a magnetic stripe key card may be used. Wireless transceiver credentialing mechanisms, such as an RFID or near-field communication (NFC) device, in which authentication information is wirelessly transmitted through a short-range wireless protocol implemented on a physical authentication device, may be used. These types of physical authentication devices typically comprise an NFC transceiver and transmit information when in very close proximity—i.e., a few centimeters or less—of another NFC transceiver, and may include key fobs, cards, wearable devices, or smartphones, for example. They may also comprise capacitive proximity sensors and targets.

Several embodiments of a remote door lock may be implemented according to the present disclosure. FIG. 1 shows logical block diagrams of various embodiments. Lock 100 may comprise a WiFi radio 101 and an access authentication module 102. As shown, the access authentication module 102 is non-RFID credentialing, meaning it may authenticate access by other methods previously mentioned (e.g., keypad, algorithm, etc.). In embodiments, non-RFID credentialing may include biometric credentialing, such as fingerprint recognition, facial recognition, retina scans, or voice recognition. It is contemplated that locks with such biometric credentialing capabilities may include the corresponding hardware, software, and/or firmware to execute such credentialing, which many include cameras, touch pads, scanners, speakers, and other equipment. Lock 110 may comprise both a WiFi radio 111, one or more local RF protocol radios 113, and an access authentication module (non-RFID credentialing) 112. Lock 120 may comprise no WiFi radios, but may have one, two, or more types of local RF protocol radios, including local RF protocol radio 1 123 and local RF protocol radio 2 124, and an access authentication module 122.

Another embodiment is shown as lock 140, which may comprise a WiFi radio 141 and an access authentication module 142. The access authentication module 142 may comprise non-RFID credentialing methods but may also comprise an RFID credentialing module 145. The RFID credentialing module 145 may be implemented by BLE or another type of NFC (i.e., a wireless transceiver). Lock 150 may comprise a WiFi radio 151, a local RF protocol radio 153, access authentication module 152, and RFID credentialing module 155. In some embodiments, BLE may be used to implement both the local RF protocol radio 153 as well as the RFID credentialing module. For example, BLE may be used to both connect the lock to the internet and to read a credential. Lock 160 may comprise one, two, or more local RF protocol radios 163, 164, an access authentication module 162, and RFID credentialing module 165. The plurality of local RF protocol radios may be implemented by, for example, a Zigbee radio and a BLE radio, and in some embodiments the Zigbee radio may be used to connect the lock to the internet and the BLE radio may be primarily used to implement the RFID credentialing module 165 to read a credential. In such embodiments, the BLE radio may be used as a backup to connect to the internet if the Zigbee radio cannot connect and a gateway exists on site that can use BLE to communicate with the lock and WiFi to communicate with the internet. Lock 170 may have no network connectivity but may comprise an access authentication module 172 and an RFID credentialing module 175. which may be implemented by BLE or another NFC transceiver.

Figure 2:
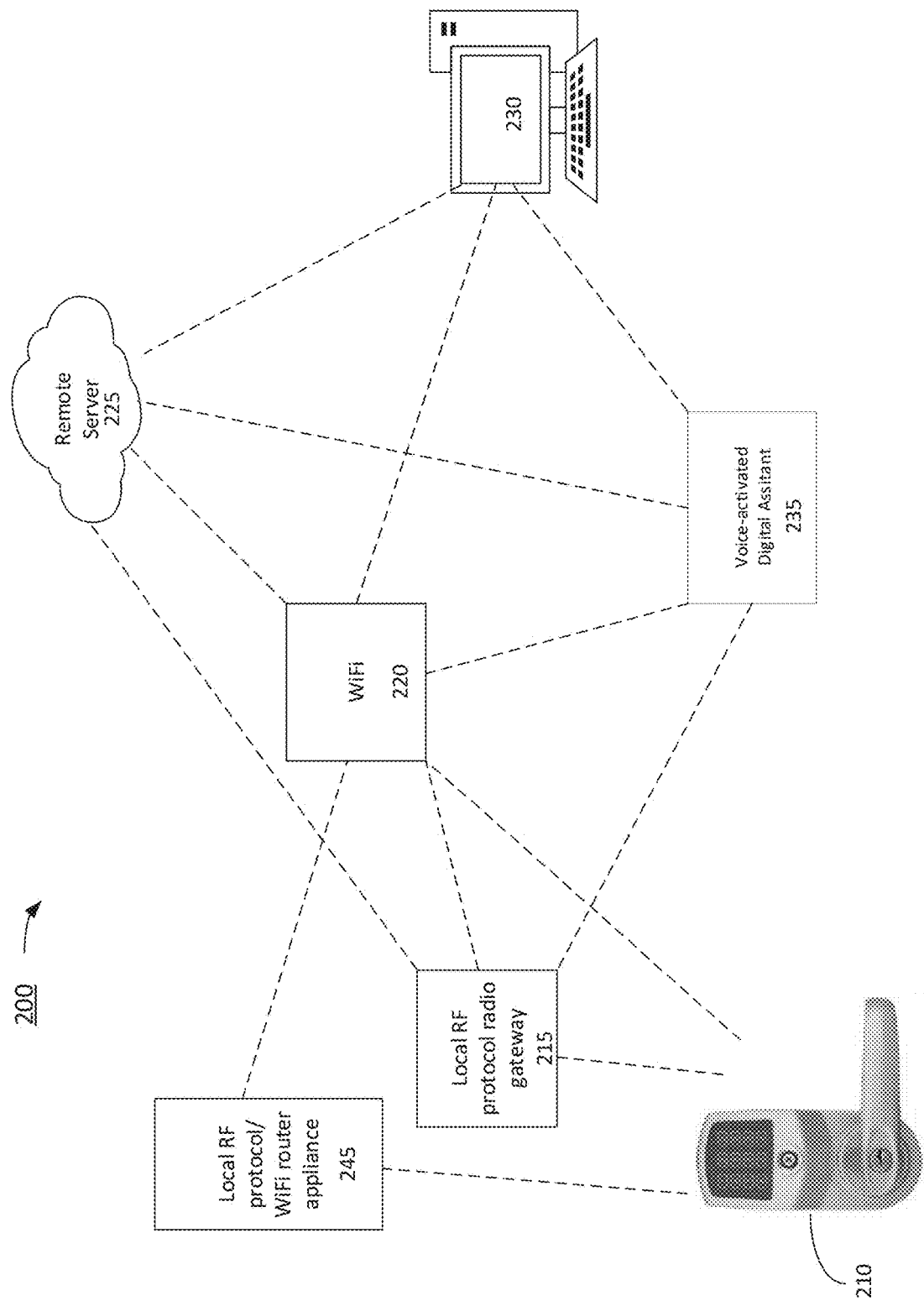
FIG. 2 is a logical network diagram showing a lock and a plurality of network components to which the lock may be directly or indirectly connected.

FIG. 2 shows a network diagram 200 of a lock 210 and various network elements to which it may be connected. In embodiments wherein the lock 210 comprises a local RF protocol radio, the lock 210 may connect to an appliance 245 that combines a local RF protocol gateway with a WiFi router. In embodiments wherein the lock 210 comprises a local RF protocol radio, the lock 210 may connect to a local RF protocol gateway 215, which in turn may connect to a WiFi router 220. In embodiments wherein the lock 210 comprises a WiFi radio, the lock 210 may directly connect to the WiFi router 220 instead of or as an alternative to connecting to the local RF protocol gateway. The WiFi router 220 may then connect to the remote server 225 to transmit information sent from the lock 210. The remote server 225 may connect to an administrative user computing device 230 to send and receive information. The remote server 225 may store information transmitted from the lock 210 and present it at the computing device 230 to allow the administrative user to view the information and control various settings of the lock, such as lock access codes and credentials, and sleep and wake schedules. In some embodiments, the computing device 230 may be within a same LAN as the WiFi and in others it may be remote, which allows administrative users anywhere to configure lock settings via the remote server 225.

In some embodiments, the network may include a voice-activated digital assistant 235 (e.g., Google Home®, Amazon Alexa®, etc.), which may connect to one or more of the network components to change the settings on the lock 210. The voice-activated digital assistant 235 may be configured to receive a voice command such as "change the lock sleep settings to conserve maximum battery power between 10 pm and 6 am every day." Other example commands may include: "set heartbeat interval to 8 hours," "create guest access for Jane Doe using PIN code 1234 on Friday at 2 pm until Sunday at 11 am," or "create access user named John Doe using PIN Code 2468." In commercial settings, examples may include: "add Jane Doe to door 23," "add access user Jane Doe to Door Group 251," or, "cancel Jane Doe's access to all doors."

A number of challenges related to credentialing exist with standalone door locks. Aspects of the present disclosure are related to addressing such credentialing problems.

In certain building environments, there are large numbers of doors in remote locations. These doors can be difficult and expensive to connect via cable to the centrally located door controllers and computer systems. To address this difficulty in the industry, some door lock companies and system manufacturers have developed wireless communication capabilities that allow a standalone door lock to communicate with central computer software via a local protocol wireless network. The elements of this solution may include (a) local protocol RF transceivers with a proprietary or industry-standard non-WiFi radio frequency (Z-Wave, Zigbee, or Bluetooth) installed in both the door locks and in/on the system door controller and (b) multiple additional gateways that communicate with the door locks through the proprietary or industry-standard frequency, and by which each gateway then communicates through a WiFi or wired router to the Internet.

Some door lock companies and system manufacturers have developed wireless communication capabilities that allow a standalone door lock to communicate with a local onsite computer software via a local wireless Radio Frequency (RF) network ("Local Wireless Locks"). Other door lock companies have developed wireless communication capabilities that allow a standalone door lock to communicate with computer software hosted offsite in the internet via a local RF network (Z-Wave, Zigbee, WIFI or Bluetooth) in which the locks use a gateway, a wired router or a WIFI router to communicate to the Internet ("Connected Locks"). These locks communicate with software in the internet for functions like adding users (or user credentials), deleting users (or user credentials), pulling event information from the lock (called an "audit trail") and more. While locks communicate with the internet to exchange information, many hold the actual credentials (e.g. PIN codes, mobile phone credential, card credential, biometric signatures, etc.) on the lock itself at the "edge" of the network to quickly identify which users are allowed in. This allows a user instant access without the need for the lock to "check in" with the internet hosted software every time to verify a user is allowed in. This also provides users a better experience. For example, if a lock had to communicate through the internet each time a user wanted access, all users would have to wait for the lock to communicate before gaining entry. Also, if the internet connection is down, users would not be able to access the property at all.

The problem with this solution is that locks only have storage capacity for a finite number of user credentials, and if the access control administrator had a need to manage more credentials (users) than a single lock could hold, certain users would not be able to access that door lock.

Figure 3:
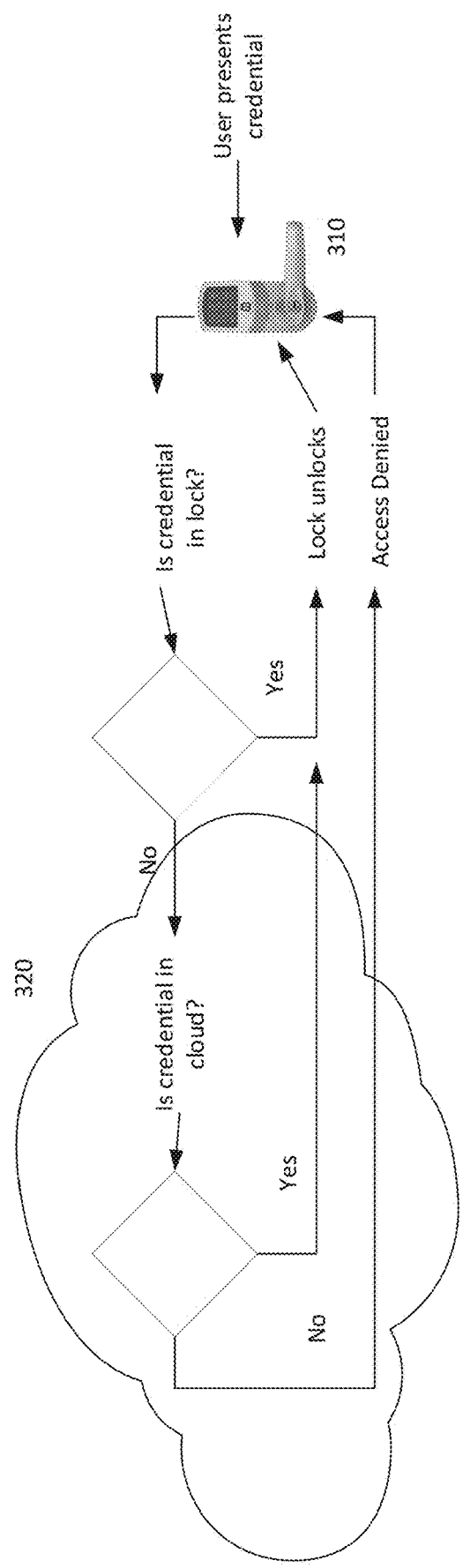
FIG. 3 is a logical network diagram showing how cloud credential buffering may be performed according to an embodiment of the present disclosure.

The present disclosure addresses the storage capacity issue via devices, systems, and methods for "cloud credential buffering," which may be referred to throughout the disclosure as "CCB." CCB may be implemented via the method shown in FIG. 3. As shown, a door lock 310 first checks to see if a credential (PIN, Mobile, Card, biometric, etc.) presented by a user is valid on a lock to immediately let the user in. If the credential is NOT on the lock, a cloud system 320 of the present disclosure (which may comprise one or more servers, databases, applications, and/or services, and which may be referred to simply as "the system" or "the cloud") may receive a "Failed Access" message (or any other message that indicates the presented credential does not exist on the lock) over the internet from the lock 310.

The system 320 may then check a list of "Buffered Credentials" that are stored in the cloud. If the presented credential matches any of the Buffered Credentials, the system may send an unlock command to the lock 320 allowing the user access.

Figure 4:
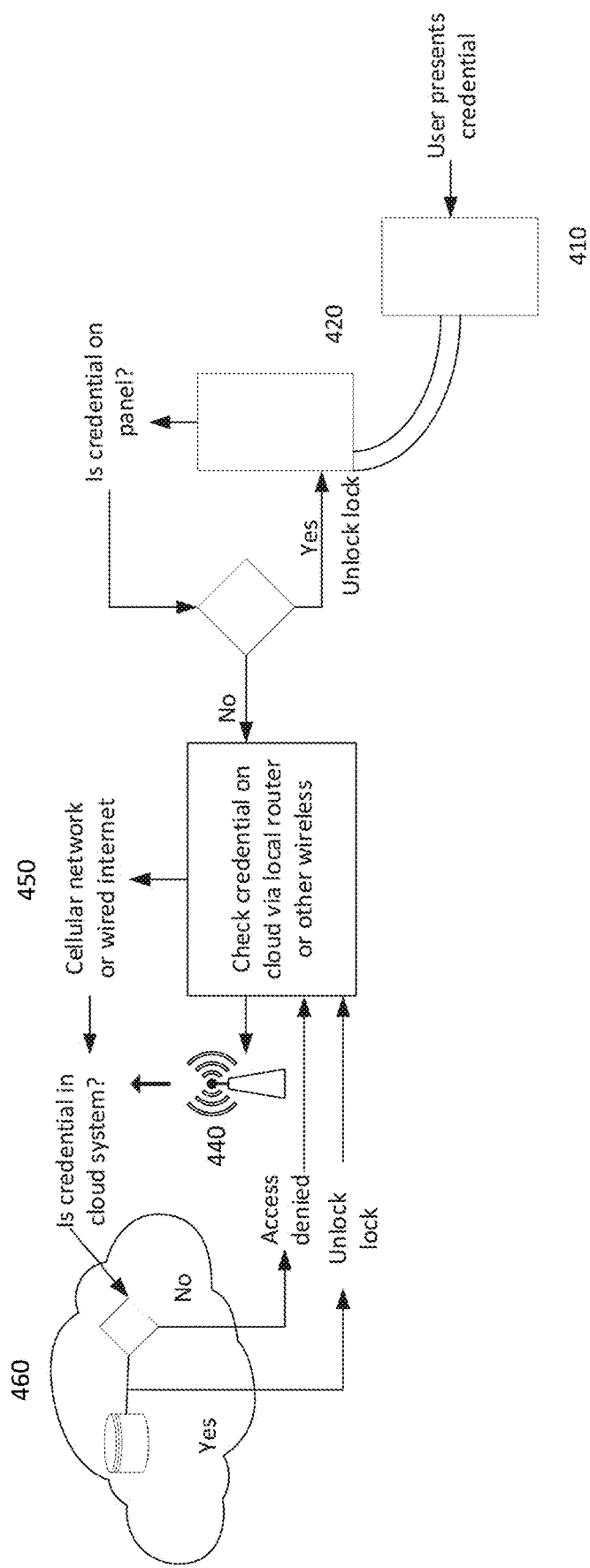
FIG. 4 is a logical network diagram showing how cloud credential buffering may be performed according to an access panel embodiment of the present disclosure.

FIG. 4 illustrates the cloud credential buffering system in an embodiment wherein a user presents a credential to a door lock 410, and the door lock 410 is wired to an access panel 420, as may occur in wired systems. Matching credentials that indicate a user is authorized to enter may be stored on the access panel 420. These systems may nonetheless utilize and communicate with the remote cloud system of the present disclosure via a local area network (LAN) via a wireless router 440, or over a wide area network (WAN) via a wired internet connection or cellular network 450 to check, if no matching credential is found at the access panel, whether a matching credential is found at the remote cloud server 460. It is contemplated that in various embodiments, any combination of LAN/WAN, local wireless routers, wired internet connections, and/or cellular networks may be utilized to connect the locks of the present disclosure to the remote cloud server of the present disclosure.

Figure 5:
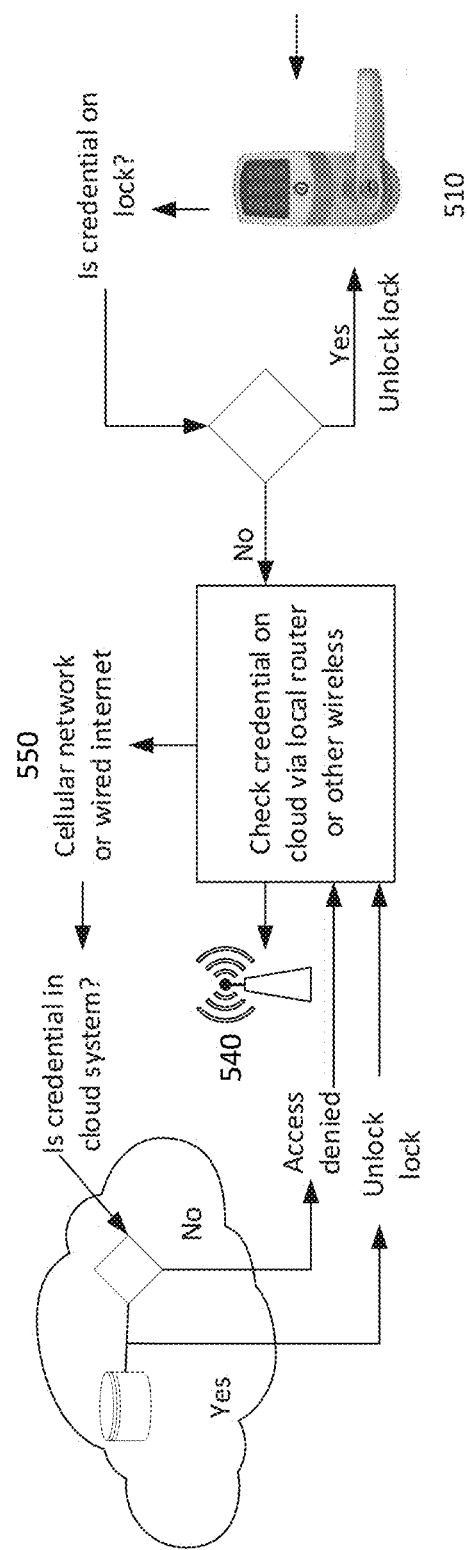
FIG. 5 is a logical network diagram showing how cloud credential buffering may be performed according to a smart lock embodiment of the present disclosure.
Figure 6:
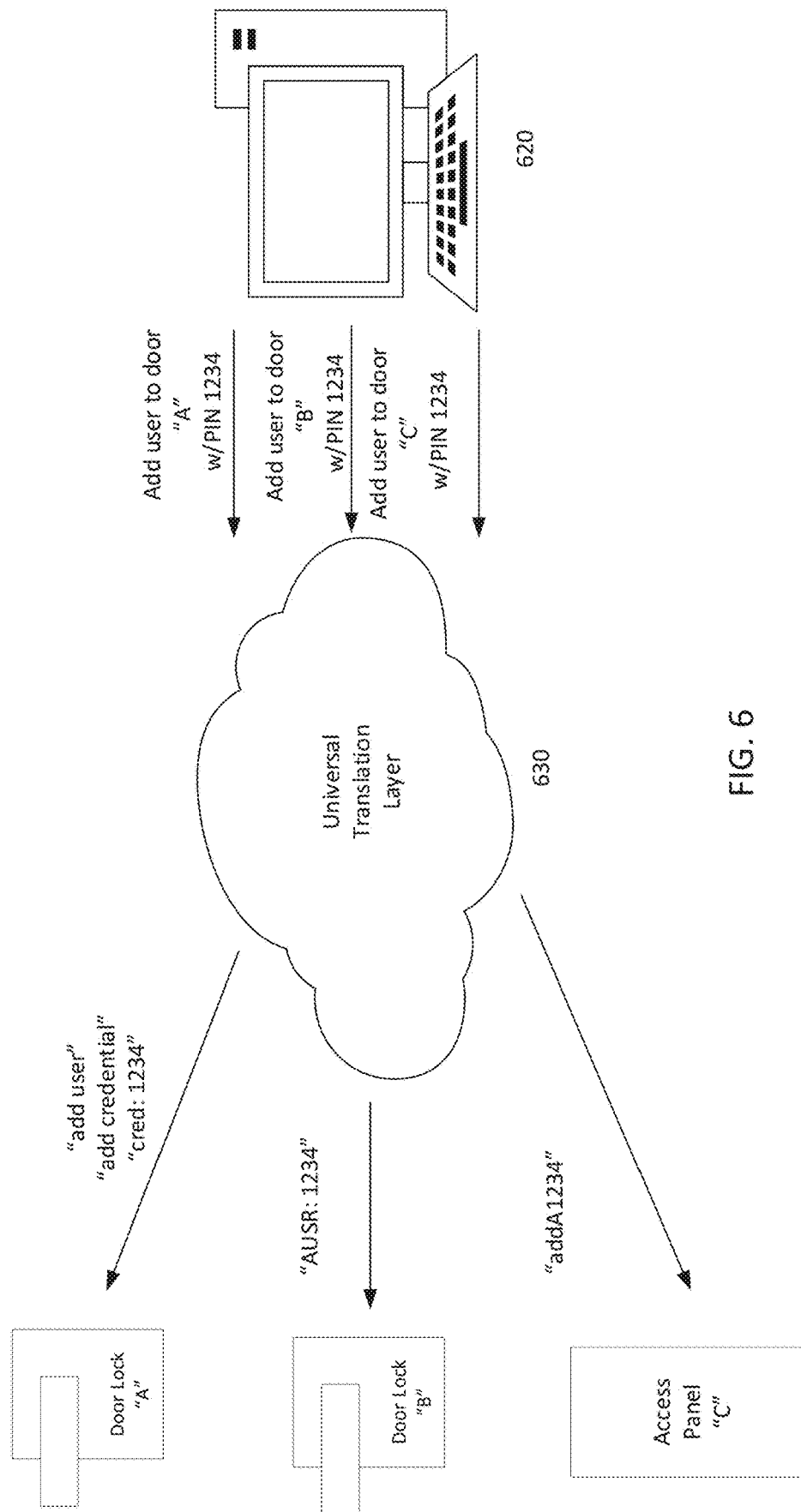
FIG. 6 is a logical network diagram depicting how a universal translation layer may be used to communicate commands to different types of locks and panels according to an embodiment of the present disclosure.

FIG. 5 is similar to FIG. 4 but illustrates the cloud credential buffering system in an embodiment wherein a user presents a credential to a standalone door lock 510, which may store some credentials on the lock 510. The lock 510 may utilize and communicate with the remote cloud system of the present disclosure via a local area network (LAN) via wireless router 540, over a wide area network (WAN) via a wired internet connection or a cellular network 550 to check, if no matching credential is found at the access panel, whether a matching credential is found at the remote cloud server. It is contemplated that in various embodiments, any combination of LAN/WAN, local wireless routers, wired internet connections, and/or cellular networks may be utilized to connect the locks of the present disclosure to the remote cloud server of the present disclosure.

The overall system depicted in FIGS. 4 and 5 may implement various embodiments of solutions utilizing cloud credential buffering. Another problem with standalone locks generally is that errors related to synching credentials can occur. Often, user credentials are entered into a central access control system but have not arrived at the lock when the user presents the credential at the lock. For example, a hotel or vacation rental guest may have booked a unit at the last minute and received a PIN to enter the unit. If the system did not yet have time to push the PIN to the lock, the user would not be granted access to the unit, even though the credential they are presenting (a PIN in this case) is the proper credential.

Or, if the guest had booked the unit weeks prior but there was an error with either the access control system sending the credential or with the lock receiving the credential, the user would not be granted access to the unit, even though the credential they are presenting (a PIN in this case) is the proper credential.

The system of the present disclosure solves such credential synching problems. When the credential is presented and denied at the lock 510, the system software in the cloud 580 may receive from the lock an access denied message or a message that indicates the credential is not on the lock. The system may then check its data to see if the credential actually should have been accepted if the credentials had already been properly synched at the lock. If the credential should have been accepted, the system 580 may resend the credential to the lock (or send it for the first time if there was an error sending prior). In other words, instead of immediately denying access to a user at a lock, the system 580 utilizes the initial "access denied" or other signal to trigger a process to check for unsynched credentials. Also, the system may send a command to the lock to immediately open for the user as a result of the proper credential having just been presented.

Another possible error is related to lock malfunctions themselves. Often user credentials are entered into a cloud-based central access control system and are sent to a connected door lock, but are not on the lock when the user presents the credential at the lock because there was an error with the lock receiving the credential. As a result, the user is not granted access to the unit, even though the credential they are presenting is the proper credential.

The system of the present disclosure addresses lock malfunction issues as follows. In embodiments, cloud-based system of the present disclosure may, upon receiving a signal that a lock has malfunctioned and not received a credential, simultaneously resend the credential to the lock and also send an unlock command. The system may then wait for a confirmation from the lock that the credential has arrived, and it may also wait for a confirmation from the lock that the unlock command has arrived. Then, the system will wait a specified period of time to confirm that the unlock command was successful in unlocking the lock and it will wait a separately specified period of time to receive the confirmation from the lock that the credential has been received by the lock or was used on the lock and that the lock opened with the credential. If the system does not receive both of these confirmations, it may send a notification to a prespecified contact alerting them of the specific malfunction on the lock.

Yet another problem with standalone locks is that users themselves may have trouble correctly operating the lock. Often users are given credentials to access a connected door lock, but when trying to gain access the lock will not unlock for the user because the user is either (1) presenting the credential incorrectly (e.g. entering a PIN of 1235 when the correct PIN is 1234), (2) trying to gain access outside of the designated access time (e.g. user trying to use a mobile phone credential at 2:50 pm when the credential does not start to allow access until 3:00 pm, or (3) the user is using the credential on a lock they are not authorized to enter even though they have authorization to other locks on the system (e.g. an office employee who has access to the front door, trying to use their credential on a storage room door).

An aspect of the present disclosure provides resolutions to use error issues in several ways. In embodiments, the cloud-based system may identify that the user seems to have some access rights in the system but is using them incorrectly and may send an optional notification to either or both the user and the system administrator. The message to the user may include a clarification of the user's rights and credential (e.g. "Dear user, it seems you may be trying to access a door with an incorrect code. As a reminder, your correct code is 1234" or "Dear user, it appears that you may be trying to get access to a unit prior to your arrival time. As a reminder, your access will start at 3:00 PM"). The message sent to the system administrator may notify the administrator of each problem.

In embodiments, instead of just notifying the relevant parties, the system can be preconfigured to account for common errors and can reconfigure itself to accommodate the user's behavior. For example, when an access user tries to enter early, instead of notifying them of their mistake the system can simply allow access because it is only a 10 minute difference. Or, in the case where the employee tries to gain access to a storage room for which they have not been given permission, the system can be preconfigured to allow them access to that door as long as they have a level of permission that would be allowed in that room.

It is contemplated that there are numerous types of access user errors, which may not all be foreseeable by a system administrator. To foresee all the circumstances when a user might make an error and preconfigure the system's correction to that error, the system may, in embodiments, also use an artificial intelligence (AI) algorithm to determine if a user should be granted access. For example, the system could gather scenarios and probabilities for each case that determine if the user should be able to access a door they did not previously have access to and could make an automated determination of whether the user could enter. This same logic could also be used for more specific notifications to the user.

Administrative and/or organizational users who implement multiple access control devices throughout multiple access points throughout their organizations (i.e., via connected door locks, parking garage gates, elevators, magnetic locks, etc.) often desire to use one cloud-based access control software system to control all access points. However, because many of these door locks may be in remote areas in their buildings and because many of their doors may also be spread across different geographic locations, such a cloud-based access control system would have to be able to manage (from the internet) many different lock types and locking hardware. For example, locking an elevator requires a different locking mechanism than locking a door to a pool area, and locking a pool area door requires a different mechanism than locking an apartment unit door. While there exists a lock for each of these door types, the best lock for each door may be made by different manufacturers, and a single manufacturer's brands may not all be the best choice for every door in a building. Even if a single manufacturer's locks are used by an organization, the different models from that lock brand will all have very different capabilities.

Because of the difficulty in managing many different lock types and brands on the same system, access control software companies have opted for one of two solutions: (a) require that each connected lock check back to a local central database each time an access user presents a credential so the credential can be verified in a central system and not at the "edge" device or (b) standardize their integrations to one or two connected wireless lock brands and models.

While solutions (a) and (b) above may solve some of an administrative user's problems, companies implementing these systems may end up forcing sub-optimal solutions onto the administrative users because their system might not control the perfect lock for the circumstance. For example, referring briefly to FIG. 9 and door lock "A," door lock "B," and access panel "C," some connected locks are capable of reporting back to the internet their remaining battery life and some (such as depicted door lock "A") are not. If an access control software provider has standardized on a lock that cannot report this status, and their customer wants that function, the customer will not get what they need. Another big difference in capability between connected locks is the number of credentials each lock can store. Some connected locks can store up to 5,000 credentials while others can store only five.

Many customers would like to use a single cloud-based system to control all of the wireless doors in their company. However, because different door types often require different lock types (and brands) and because different use cases require different credential quantities (also differing by brand), the existing solutions described above do not solve these problems. For example, the solution of requiring each lock to check back to a central system to allow access would require very expensive onsite wiring and computing power to accomplish this. Also, the other option of standardizing on one connected lock type will not allow the system to control certain doors in a building that may require other branded locks with other capabilities.

As a result, there has not existed a complete cloud-based access control software solution that can directly control from the internet any door type with locks from many manufacturers.

Figure 7:
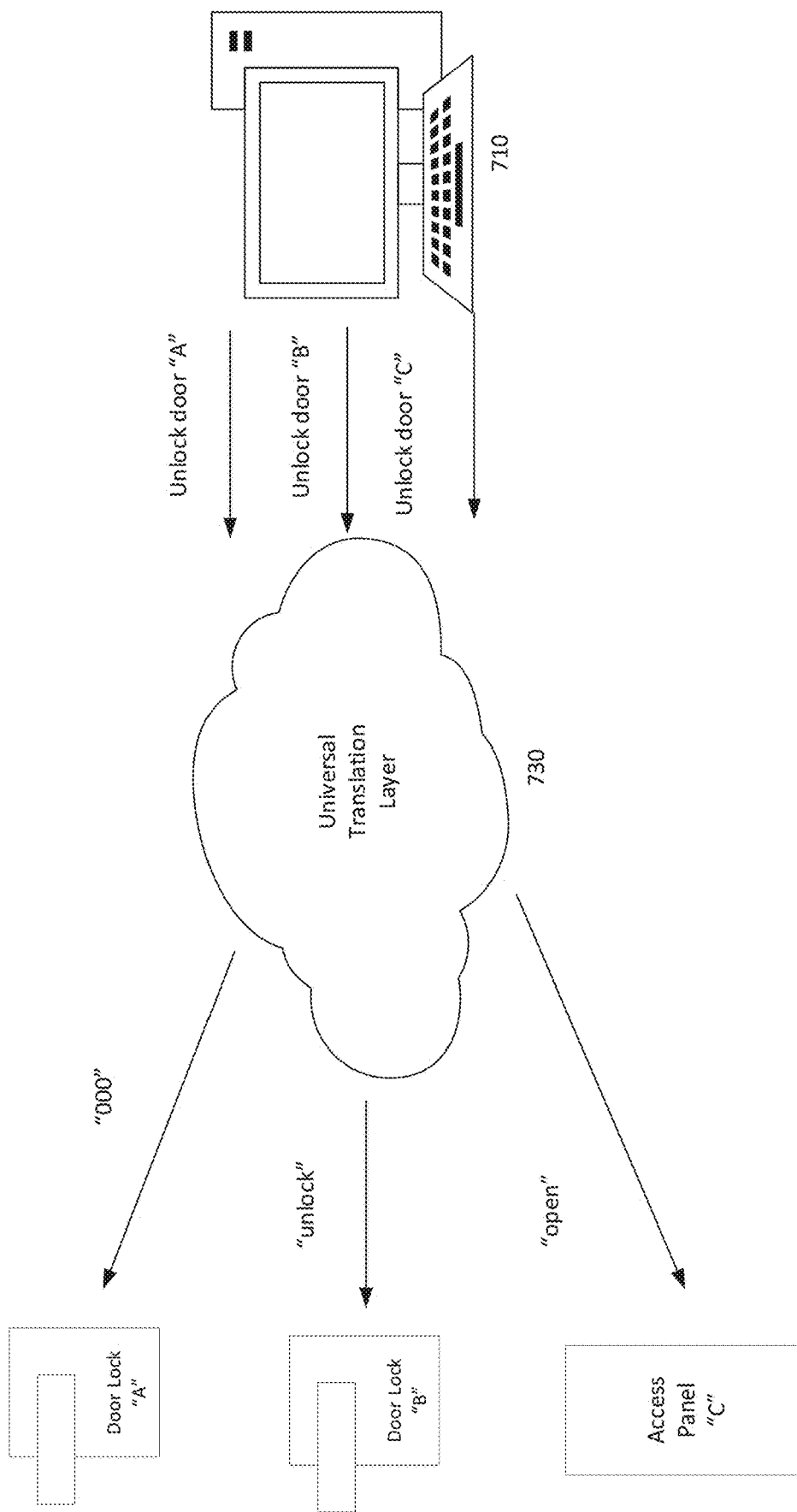
FIG. 7 is a logical network diagram depicting how a universal translation layer may be used to communicate commands to locks and panels having different language requirements according to another embodiment of the present disclosure.

As shown in FIGS. 6, 7, 8, and 9, the system of the present disclosure can, from a single cloud-based application, control many different lock types from many different brands with many different capabilities as if they all had the same capabilities. The system may use a "Universal Translation Layer" (also referred to herein as a "Lock Translation Layer" that communicates to each lock in that lock's language (i.e., various industry-standard, open-source, and/or proprietary wireless transmission protocols and commands), but then translates the specific lock's communication into a standard language of the system of the present disclosure (the "system language") and then through an API of the system (the "system API"). So, by sending an "unlock" command to the system API, the Lock Translation Layer converts that command into the many different lock languages that are connected to the system. As an example, as depicted in FIG. 7, different manufacturer's locks may require the transmission of different commands to instruct a particular lock to unlock. For instance, Lock A may require sending the numeric command "000," Lock B may require sending the text command "unlock," Lock C may require sending the text command "open," etc. Using the Lock Translation Layer 730, the system can compensate for many of the deficiencies of the locks to which it connects. For example, the CCB function outlined in FIG. 3 allows any lock connected to the system of the present disclosure to appear as though it has unlimited credential storage capabilities when actually the credentials are stored in the cloud and not on the lock. Similarly, if a lock does not have the ability to report its remaining battery life, the system of the present disclosure can store the cycle data of the lock (i.e., the number of times it has been opened) and the time it has been live on the platform to formulate an estimated battery life for the end-user customers.

Figure 8:
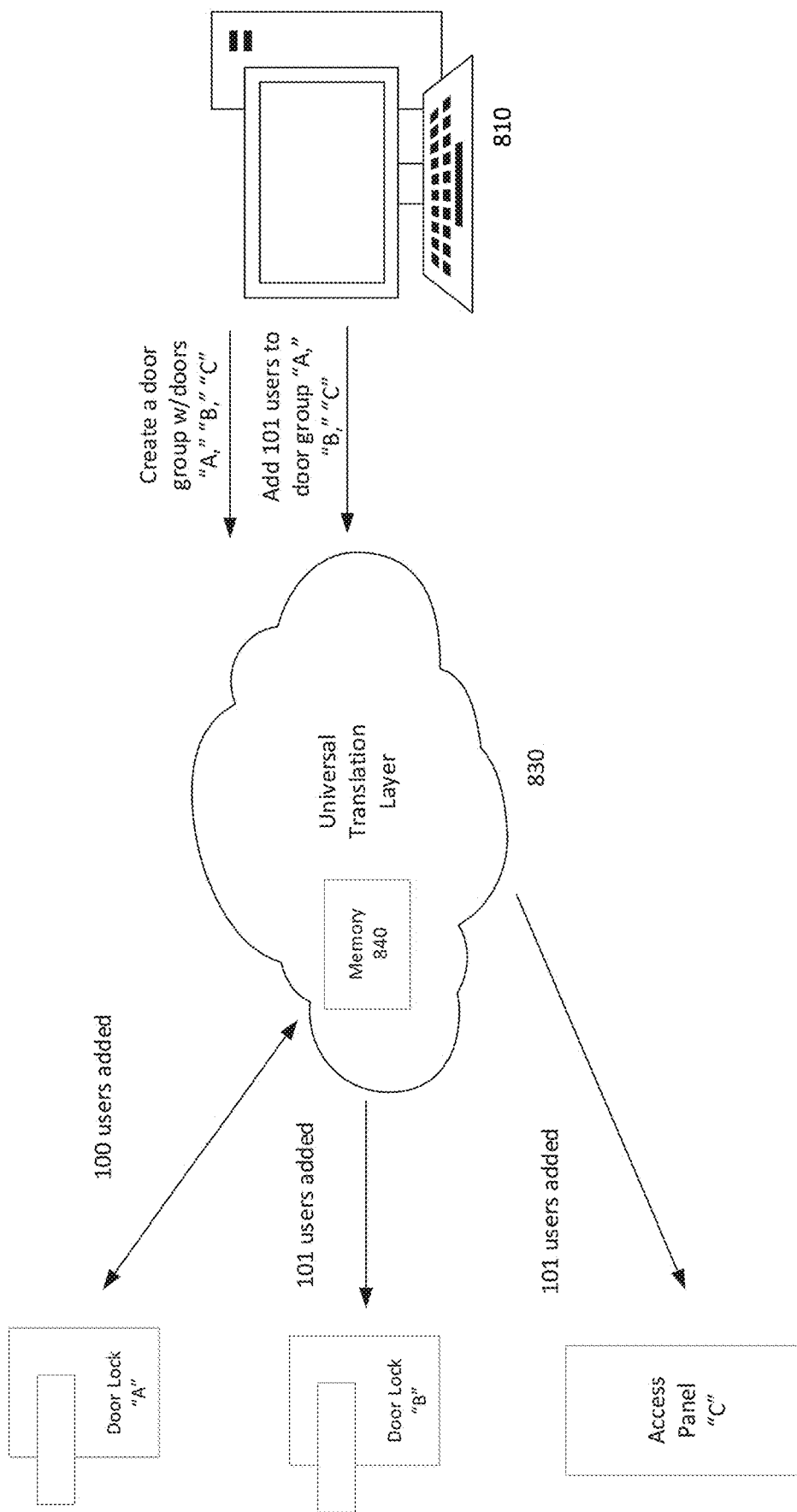
FIG. 8 is a logical network diagram depicting how a universal translation layer may be used to communicate commands to locks and panels having different features according to another embodiment the present disclosure.

FIG. 7 shows how the Universal Translation Layer 730 may operate in an embodiment to convert multiple access control device communications protocols (which may be referred to as simply "protocols" or "languages") into a common (or "standard") protocol to facilitate communication between the remote cloud system and various different access control devices. As shown, an administrative user using an interface 710 may wish to instruct three different locks on their property to unlock. The computing device implementing the interface 710 (which may be a smartphone, computer, or any other similar device) may send the commands to the Universal Translation Layer 730, which may be uniform: "unlock door A, unlock door B, unlock door C." However, if each of these locks are made by different manufacturers, each may have a slightly different executable code, instruction, or message required to make the lock actually unlock. Therefore, the Universal Translation Layer 730 may comprise a translation component that converts the command "unlock door A" to "000" for the transmission protocol of door lock A, converts the command "unlock door B" to the command "unlock" for door lock B, and converts the command "unlock door C" to the command "open" for Access Panel C. The Universal Translation Layer may facilitate communication between different manufacturer's locks not only via translating literal commands, but by creating workarounds for functional limitations of various locks. For example, in FIG. 8, the Universal Translation Layer 830 is shown having a memory 840. In embodiments, the memory 840 may implement aspects of the cloud credential buffering methods described in this disclosure. In the example of FIG. 8, one of the locks (door lock A) may have a functional limitation of only being able to add a maximum of 100 users (or 100 different credentials each associated with a different access user). The other locks (door lock B and access panel C" may be able to store more than 100 users.

An administrative user using an interface 810 may wish to create a group of three doors on a property and add 101 users to that group. The computing device implementing the interface 810 (which may be a smartphone, computer, or any other similar device) may send two related commands to the Universal Translation Layer 830: "create a door group with doors A, B, and C," and "add 101 users to door group "A", "B," "C." These commands may work to create the group and add 101 users to doors B and C, but ordinarily, the command to add the 101 users to door A might fail because it can only accept 100 users. An aspect of the present disclosure is that the Universal Translation Layer 830 may create a workaround to prevent the command from failing at door A. It may add the first 100 users to door A, and then store the extra user in the memory 840. Then, if a credential for the extra user stored in the memory 840 is needed at door A, the system may use the cloud credential buffering method described throughout this disclosure (and illustrated in FIG. 10) to unlock door A. Thus, the Universal Translation Layer 830 may effectively work around a functional limitation of one particular lock to implement universal functionality of "adding 101 users." It is contemplated that other universal functionality may be implemented to overcome different functional limitations of individual locks.

Figure 9:
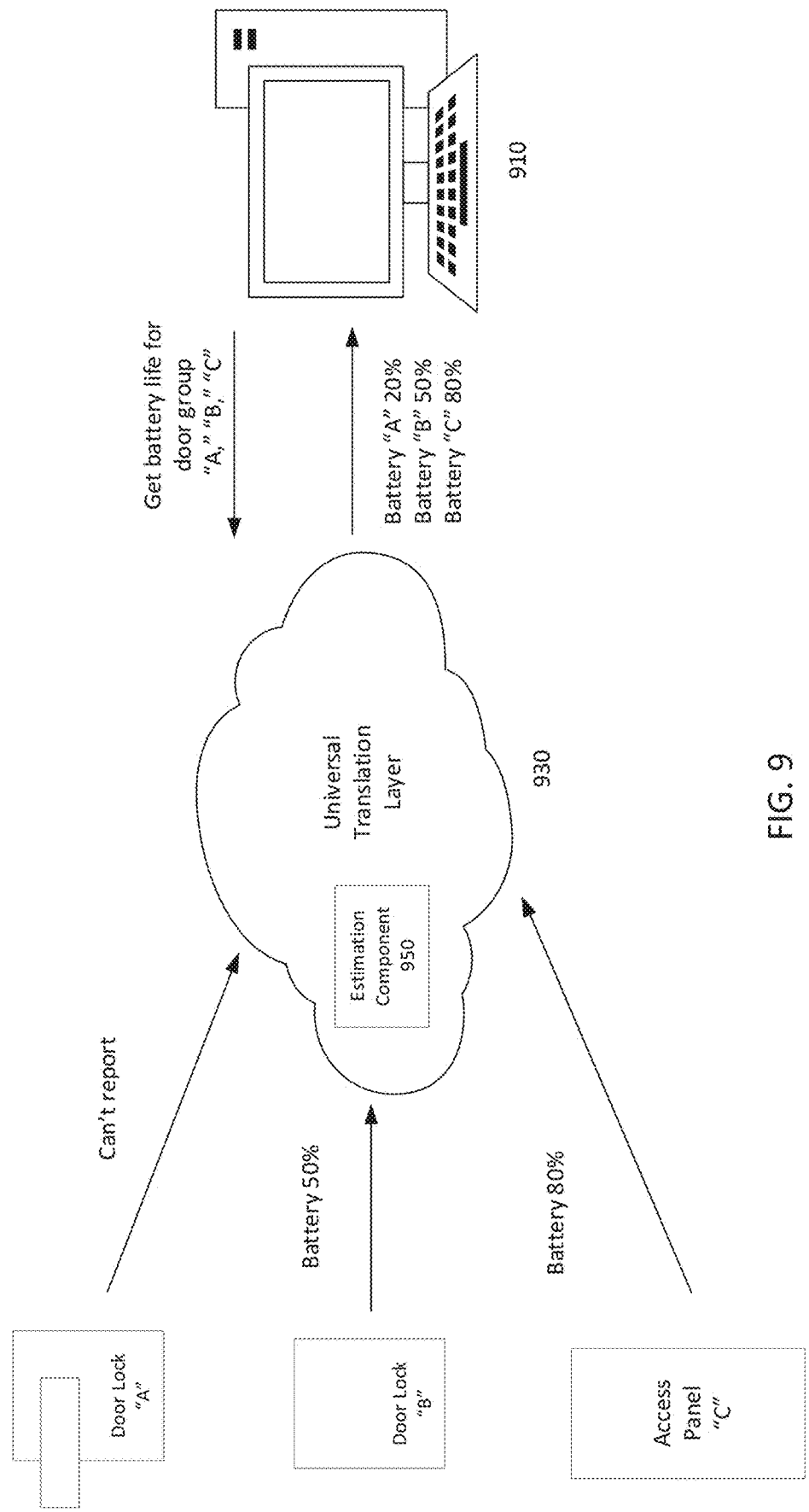
FIG. 9 is a logical network diagram depicting how a universal translation layer may be used to communicate commands to locks and panels having different capabilities according to another embodiment of the present disclosure.

Turning now to FIG. 9, shown is another embodiment in which the Universal Lock Translation layer may overcome a functional limitation of one or more different locks within an administrative user's system. Namely, some door locks do not have functionality for reporting battery life status. An administrative user using an interface 910 may wish to receive information about battery life from a plurality of different door locks within the administrative user's property. The computing device implementing the interface 910 (which may be a smartphone, computer, or any other similar device) may send a single command to the Universal Translation Layer 930: "get battery life for doors A, B, and C." These commands may work to get the battery life from door locks B and C, but ordinarily, the command to get the battery from door lock A might fail because door lock A lacks the battery life reporting functionality. An aspect of the present disclosure is that the Universal Translation Layer 930 may create a workaround to prevent the command from failing at door A via a battery life estimation component 950. In embodiments the estimation component 950 may use other information about door lock A to estimate how much battery life remains. It may use information such as when the lock was installed, known information about manufacturer and battery type, number of locks and transmissions, whether the lock has wired backup power, whether it transmits via WiFi or other local wireless protocol, and any other relevant information.

Using the estimation component 950, the Universal Translation Layer 930 may then send back to the administrative user actual battery life reports from door locks B and C, which do have the reporting functionality, and report back estimated battery life for door lock A, which does not have battery life reporting functionality. Thus, the Universal Translation Layer 930 may effectively work around a functional limitation of one particular lock to implement universal functionality of reporting battery life.

The access management system of the present disclosure solves the issues presented by organizations with disparate lock needs for different access points by offering the ideal lock for each situation and standardizing that lock's capabilities with all other locks on the system, from a single cloud-based application.

Figure 10:
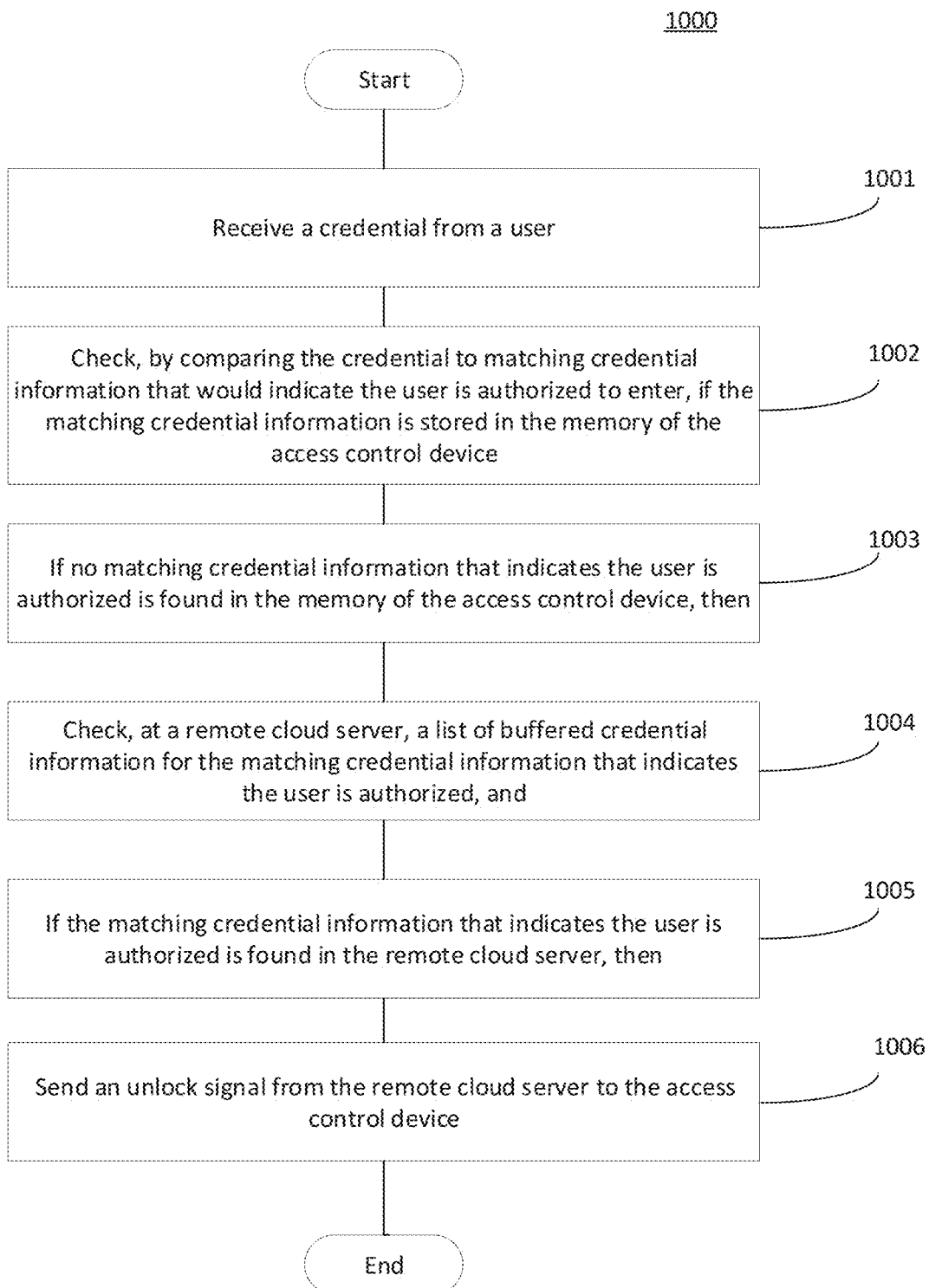
FIG. 10 is a flowchart depicting a method that may be performed in embodiments of the present disclosure.

FIG. 10 is a flowchart depicting a method 1000 of the present disclosure for operating an access control device having, a processor, a memory, and an internet connection. The method 1000 may comprise, at step 1001, receiving a credential from a user and at step 1002, checking, by comparing the credential to matching credential information that would indicate the user is authorized to enter, stored in the memory of the access control device. At step 1003, if no matching credential information that indicates the user is authorized is found in the memory of the access control device, then the method may comprise, at step 1004, checking, at a remote cloud server, a list of buffered credential information for the matching credential information that indicates the user is authorized. At step 1005, if the matching credential information that indicates the user is authorized is found in the remote cloud server, the method may comprise, at step 1006, sending an unlock signal from the remote cloud server to the access control device.

Figure 11:
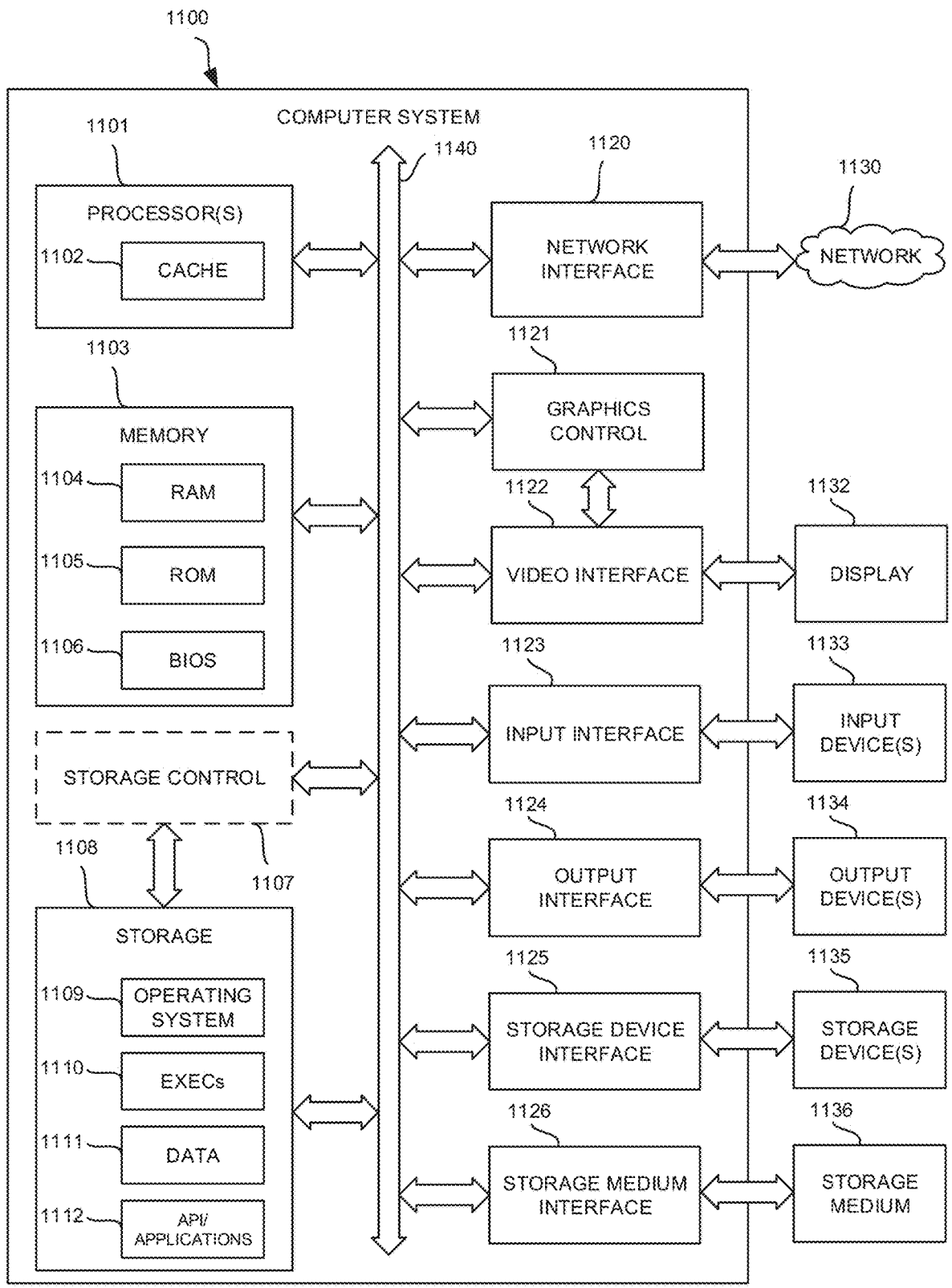
FIG. 11 is a logical block diagram of a computer that may be used to implement aspects of the present disclosure.

Referring next to FIG. 11, it is a block diagram depicting an exemplary machine that includes a computer system 1100 within which a set of instructions can execute for causing a device to perform or execute any one or more of the aspects and/or methodologies of the present disclosure. The components in FIG. 11 are examples only and do not limit the scope of use or functionality of any hardware, software, embedded logic component, or a combination of two or more such components implementing particular embodiments.

Computer system 1100 may include a processor 1101, a memory 1103, and a storage 1108 that communicate with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various tangible storage media 1136. All of these elements may interface directly or via one or more interfaces or adaptors to the bus 1140. For instance, the various tangible storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1101 (or central processing unit(s) (CPU(s))) optionally contains a cache memory unit 1102 for temporary local storage of instructions, data, or computer addresses. Processor(s) 1101 are configured to assist in execution of computer readable instructions. Computer system 1100 may provide functionality for the components depicted in FIG. 1 as a result of the processor(s) 1101 executing non-transitory, processor-executable instructions embodied in one or more tangible computer-readable storage media, such as memory 1103, storage 1108, storage devices 1135, and/or storage medium 1136. The computer-readable media may store software that implements particular embodiments, and processor(s) 1101 may execute the software. Memory 1103 may read the software from one or more other computer-readable media (such as mass storage device(s) 1135, 1136) or from one or more other sources through a suitable interface, such as network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software.

The memory 1103 may include various components (e.g., machine readable media) including, but not limited to, a random access memory component (e.g., RAM 1104) (e.g., a static RAM "SRAM", a dynamic RAM "DRAM, etc.), a read-only component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable tangible computer-readable media described below. In one example, a basic input/output system 1106 (BIOS), including basic routines that help to transfer information between elements within computer system 1100, such as during start-up, may be stored in the memory 1103.

Fixed storage 1108 is connected bidirectionally to processor(s) 1101, optionally through storage control unit 1107. Fixed storage 1108 provides additional data storage capacity and may also include any suitable tangible computer-readable media described herein. Storage 1108 may be used to store operating system 1109, EXECs 1110 (executables), data 1111, API applications 1112 (application programs), and the like. Often, although not always, storage 1108 is a secondary storage medium (such as a hard disk) that is slower than primary storage (e.g., memory 1103). Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide nonvolatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, specifically mobile devices and enterprise systems, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1130, may employ a wired and/or a wireless mode of communication. In general, any network topology may be used.

Information and data can be displayed through a display 1132. Examples of a display 1132 include, but are not limited to, a liquid crystal display (LCD), an organic liquid crystal display (OLED), a cathode ray tube (CRT), a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121.

In addition to a display 1132, computer system 1100 may include one or more other peripheral output devices 1134 including, but not limited to, an audio speaker, a printer, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, and any combinations thereof.

In addition, or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for operating an access control device, the method comprising:
   receiving a credential from a user;
   in response to determining the credential is not stored in a memory of the access control device:
   generating a failed access message that includes the credential;
   sending the failed access message to a cloud credential buffering system to request the cloud credential buffering system to check if the credential matches buffered credentials stored in the cloud, credential buffering system;
   receiving a command from the cloud credential, buffering system in response to the request; and
   determining whether to unlock the access control device based on the command from the cloud credential buffering system.

2. The method of claim 1, further comprising:
   determining to unlock the access control device if: (1) the command includes an unlock command, and (2) the command is accompanied with receiving, from the cloud credential buffering system, a resent credential to the access control device.

3. The method of claim 1, wherein:
   the command is sent via a lock translation layer configured to convert multiple access control device communications protocols into a common protocol.

4. The method of claim 3, wherein:
   the control access devices utilizes commands in a communication protocol having a plurality of separate communication steps; and
   the method further comprises converting, via the lock translation layer, the plurality of separate communication steps into fewer steps within the common protocol.

5. The method of claim 1, further comprising:
   receiving battery life reports from one or more access control devices capable of sending battery life reports;
   estimating a battery life of one or more access control devices that is not capable of sending battery life reports, and
   sending, to an administrative user interface, one or more of the battery life reports and one or more battery life estimates.

6. The method of claim 1, further comprising:
   converting a first command of the cloud credential buffering system into a second command having a different communication protocol understood by the access control device.

7. An access control device, comprising:
   memory configured to store credential information;
   an interface configured to receive a credential from a user; and
   a controller configured, in response to determining the credential is not stored in the memory, to:
   generate a failed access message that includes the credential;
   send the failed access message to a cloud credential buffering system to request the cloud credential buffering system to check if the credential matches buffered credentials stored in the cloud credential buffering system;
   receive a command from the cloud credential buffering system in response to the request; and
   determine whether to unlock the access control device based on the command from the cloud credential buffering system.

8. The access control device of claim 1, wherein the controller is further configured to:
   determine to unlock the access control device if: (1) the command includes an unlock command, and (2) the command is accompanied with receiving, from the cloud credential buffering system, a resent credential to the access control device.

9. The access control device of claim 1, wherein:
   command is sent via a lock translation layer configured to convert multiple access control device communications protocols into a common protocol.

10. The access control device of claim 9, wherein:
    the control access devices utilizes commands in a communication protocol having a plurality of separate communication steps; and
    the lock translation layer is configured to convert the plurality of separate communication steps into fewer steps within the common protocol.

11. The access control device of claim 9, wherein the lock translation layer is configured to:
    receive battery life reports from one or more access control devices capable of sending battery life reports;
    estimate a battery life of one or more access control devices that is not capable of sending battery life reports, and
    send, to an administrative user interface, one or more of the battery life reports and one or more battery life estimates.

12. The access control device of claim 9, wherein the lock translation layer is configured to convert a first command of the cloud credential buffering system into a second command having a different communication protocol understood by the access control device.

13. A non-transitory computer-readable storage medium having instructions embodied thereon, the instructions are executable by a processor and/or capable of programming a field programmable gate array, the instructions comprising instructions for:
    receiving a credential from a user;
    in response to determining the credential is not stored in the memory of the access control device:
    generating a failed access message that includes the credential;
    sending the failed access message to a cloud credential buffering system to request the cloud credential buffering system to check if the credential matches buffered credentials stored in the cloud credential buffering system;
    receiving a command from the cloud credential buffering system in response to the request; and
    determining whether to unlock the access control device based on the command from the cloud credential buffering system.

14. The non-transitory computer-readable storage medium of claim 13, wherein the instructions comprise instructions for:
  determining to unlock the access control device if: (1) the command includes an unlock command, and (2) the command is accompanied with receiving, from the cloud credential buffering system, a resent credential to the access control device.

15. The non-transitory computer-readable storage medium of claim 13 wherein the command is sent via a lock translation layer configured to convert multiple access control device communications protocols into a common protocol.

16. The non-transitory computer-readable storage medium of claim 15, wherein:
  the control access devices utilizes commands in a communication protocol having a plurality of separate communication steps, and
  the instructions comprise instructions for converting, via the lock translation layer, the plurality of separate communication steps into fewer steps within the common protocol.

17. The non-transitory computer-readable storage medium of claim 15, wherein the instructions comprise instructions for:
  receiving battery life reports from one or more access control devices capable of sending battery life reports;
  estimating a battery life of one or more access control devices that is not capable of sending battery life reports; and
  sending, to an administrative user interface, one or more of the battery life reports and one or more battery life estimates.

18. The non-transitory computer-readable storage medium of claim 15, wherein the Instructions comprise instructions for:
  converting a first command of the cloud credential buffering system into a second command having a different communication protocol understood by the access control device.

\* \* \* \* \*